(12) United States Patent
Johnsen

(10) Patent No.: US 6,707,205 B2
(45) Date of Patent: Mar. 16, 2004

(54) HIGH-SPEED, HIGH-POWER ROTARY ELECTRODYNAMIC MACHINE WITH DUAL ROTORS

(75) Inventor: Tyrone A. Johnsen, Rockford, IL (US)

(73) Assignee: Hamilton Sundstrand Corporation, Rockford, IL (US)

( * ) Notice: Subject to any disclaimer, the term of this patent is extended or adjusted under 35 U.S.C. 154(b) by 0 days.

(21) Appl. No.: 09/906,009

(22) Filed: Jul. 16, 2001

(65) Prior Publication Data
US 2003/0011259 A1 Jan. 16, 2003

(51) Int. Cl.[7] ............................................. H02K 16/00
(52) U.S. Cl. ....................... 310/114; 310/112; 310/113
(58) Field of Search ................................. 310/114, 113, 310/112, 149

(56) References Cited

U.S. PATENT DOCUMENTS

| 3,577,002 | A | * | 5/1971 | Hall et al. ...................... 290/46 |
| 4,196,366 | A | * | 4/1980 | Schiethart .................... 310/114 |
| 4,219,739 | A | * | 8/1980 | Greenwell ................. 290/38 R |
| 4,233,555 | A | * | 11/1980 | Roche .......................... 307/16 |
| 4,424,464 | A | * | 1/1984 | Ikegami ....................... 307/16 |
| 4,625,160 | A | * | 11/1986 | Hucker ........................ 310/115 |
| 4,670,678 | A | * | 6/1987 | Jager et al. ................. 310/114 |
| 4,755,736 | A | * | 7/1988 | Fluegel ........................ 310/113 |
| 4,785,213 | A | * | 11/1988 | Satake .......................... 310/114 |
| 5,091,668 | A | * | 2/1992 | Cuenot et al. ......... 310/156.61 |
| 5,281,879 | A | * | 1/1994 | Satake et al. ................ 310/114 |
| 5,430,362 | A | * | 7/1995 | Carr et al. ................... 318/139 |
| 5,764,036 | A | * | 6/1998 | Vaidya et al. ............... 310/149 |
| 5,838,085 | A | * | 11/1998 | Roesel et al. ............... 310/112 |
| 5,874,797 | A | * | 2/1999 | Pinkerton .................... 310/112 |
| 6,201,331 | B1 | | 3/2001 | Nakano ....................... 310/114 |
| 6,211,597 | B1 | | 4/2001 | Nakano ....................... 310/266 |
| 6,278,211 | B1 | * | 8/2001 | Sweo .......................... 310/114 |
| 6,320,350 | B1 | * | 11/2001 | Take ............................ 318/114 |
| 6,364,635 | B1 | * | 4/2002 | Goettel et al. ........... 417/410.1 |

FOREIGN PATENT DOCUMENTS

DE    3423403 A1 *  1/1986  .......... H02K/17/36

* cited by examiner

*Primary Examiner*—Joseph Waks
(74) *Attorney, Agent, or Firm*—Eugene V. Feldman

(57) ABSTRACT

A high-power electrodynamic machine operates at a relatively high rotational speed and has dual rotors. In a preferred generator embodiment, one relatively massive first rotor having a magnetic device integral therewith is dedicated to the main generator. The exciter generator, which is relatively less massive, is isolated on a second rotor, which has a magnetic device integral to it. Only three bearings are required. The distance between the two bearings for the first rotor is relatively short, and the first rotor is relatively stiff, both of which facilitate operation of the first rotor below the critical speed. The junction of the first and second rotors further includes support of a junction end of the second rotor. The second rotor is driven by a prime mover via the first rotor. Means for providing electrical connections between the magnetic devices of the first and second rotors is also provided.

16 Claims, 6 Drawing Sheets

SECTION D-D

HIGH-SPEED, HIGH-POWER ROTARY ELECTRODYNAMIC MACHINE WITH DUAL ROTORS

FIELD OF THE INVENTION

The invention relates generally to a high-power rotary electrodynamic machine, and more particularly to a high-power generator or motor that operates at a relatively high rotational speed and has dual rotors.

BACKGROUND OF THE INVENTION

A generator may be used to convert mechanical energy from a prime mover into electrical energy. A motor performs the opposite function. For simplicity, the discussion hereinbelow is limited primarily to generators.

Generators typically use a rotating member known as a rotor mounted within a stationary member known as a stator. The rotor is rotatably driven by a prime mover. In an aircraft, a generator may be driven by means of a main or auxiliary engine by means of a gearbox, a constant speed drive (CSD) transmission, an engine starter, etc. The electrical energy produced by the generator illuminates the cabin, powers avionics, heats food, etc. Electrical power requirements typically are greater for newer aircraft as compared with their predecessors because more electrical devices and loads are used; in particular, flight control surfaces are increasingly being actuated by electric power rather than hydraulics.

In general, it is advantageous to design a generator without brushes or slip rings for conducting electrical current to or from the rotor. Brushes and slip rings wear and thus reduce the reliability of the generator. For relatively small power needs, a generator without brushes or slip rings (a "brushless" generator or alternator) may be designed by placing a conductor such as a winding in a stator and providing one or more permanent magnets within a rotor. When the rotor is driven, the resulting rotating magnetic field induces a current in the stator conductor. The conductor may then deliver the induced current to an electrical load.

When the need for electrical power delivered by the generator is relatively large, however, a rotor winding is generally used instead of a permanent magnet. The rotor winding, or main field winding, becomes an electromagnet when the winding is connected to a current source. The rotor winding may be turned off if a short circuit occurs. The winding produces a rotating magnetic field of sufficient intensity to generate the relatively large power. This magnetic field may be regulated by regulating the current to the main field winding. The main field winding must be relatively rigid, compact, and balanced so that it may be rotated at high speed without undue deformation or vibration. Some means for supplying the electrical current to the main field winding must be provided, however, preferably without resorting to slip rings or brushes.

It is known to supply the current to the main field winding without using brushes or slip rings by using magnetic induction. Magnetic induction is best understood by reference to a typical prior art brushless alternator. A prior art brushless alternator uses three distinct generators: a main generator, an exciter generator, and a permanent magnet generator (PMG). Each of the generators comprises a rotating member integral to a common rotor of the brushless alternator and a stationary member integral to a common stator assembly of the brushless alternator. The common rotor is typically rotatably supported by two bearings.

The rotating member of the PMG, which includes one or more permanent magnets, creates a rotating magnetic field when the rotor is driven by the prime mover. The rotating magnetic field induces an alternating current (AC) in a stationary PMG armature winding located within the stator of the brushless alternator. This induced AC in the PMG armature winding is typically rectified and voltage regulated in a stationary rectifier connected to the stator to supply a direct current (DC) to a stationary field winding of the exciter generator, also located within the stator. This field winding uses the DC to produce a stationary magnetic field. Within that field, an exciter armature winding integral to the rotor is rotated to generate a higher level of current than the PMG current output, typically in the form of a three-phase AC. To generate the desired magnetic field in the rotating main field winding, DC, not AC, must be used. Because the output of the exciter armature winding is AC, a rotating rectifier assembly located within the rotor is typically used to rectify this AC to DC. This DC is connected to the main field winding in the rotor. Finally, this main field winding generates a rotating magnetic field that induces AC into the main generator stator and then to a load. The main field winding generally comprises a plurality of coils of wire wound around a magnetic core. This arrangement is commonly referred to as "poles."

When relatively lower electrical output power is required from a generator, at typical aircraft power frequencies (e.g., approximately 350 to 800 Hz), wire-wound rotors may operate below the first "critical speed", i.e., at "subcritical" speed. By definition, the first "critical speed" is the speed at which the rotor is in its first dynamic resonance mode. At this speed, the rotor bends and displaces radially. At or above the critical speed, bearing loads increase and rotor deflection is magnified; a risk exists that the rotor will rub against the stator. Subcritical operation also precludes the need for additional torque in the prime mover to force the rotor to pass quickly through the critical speed. In addition, subcritical operation reduces harmful vibration for the generator and for the surrounding aircraft structures. Thus, a generator rotor preferably is operated at subcritical speed.

When relatively greater generator output power is required (because more electrical devices and loads are used in newer aircraft as compared with their predecessors), increasing the rotor weight and the "bearing span," i.e., the distance between bearings supporting the rotor, typically results in a design using relatively slower rotor speed and an increased number of poles for a given output frequency range. The increased number of poles and heavier rotor inherently cause the generator weight to increase. However, the aerospace industry is always attempting to reduce the size and weight of aerospace components. One way to reduce the size and weight of generators while achieving a relatively high electrical output is to design for comparatively high rotor speeds. Modern aircraft generators may operate between approximately 7,000 and 40,000 rpm.

In typical prior art brushless alternators, two bearings support a one-piece rotor that includes the three separate generators mentioned hereinabove. The bearings are typically disposed at each end of the rotor. In general, the larger the required electrical output, the larger the generator and its electromagnetic parts. As the requirement for output power continues to increase in new aircraft, the rotor weight, the bearing span, the bearing rotational speed, the rotor centrifugal forces, and the support stiffness may not permit safe and functional alternator operation.

Prior art attempts to build a generator to operate at high power within weight and size requirements demanded by modern aircraft have failed. The present invention is specifically directed to overcoming the above-mentioned problems.

DISCLOSURE OF THE INVENTION

Accordingly, an object of this invention is to enable high-speed operation of a high-power rotary electrodynamic machine.

An additional object is to provide an improved generator that reduces size and weight while delivering relatively high output power.

Another object is to provide a generator that, compared with those of the prior art, is relatively straightforward to manufacture and repair.

Yet another object is to provide a high-speed, high-power rotary electrodynamic machine that operates below the critical speed of its rotor assembly.

According to the invention, a rotary electrodynamic machine comprises a stator having a plurality of windings; a first rotor being mounted within the stator for rotation about an axis, the first rotor having a magnetic device formed integral therewith, and being disposed in proximity to one of the plurality of stator windings, and a second rotor being mounted within the stator for rotation about an axis, the axis of rotation of the second rotor being coaxial with the axis of rotation of the first rotor, the second rotor having junction and pivot ends, the second rotor being connected to the first rotor at the junction end, the second rotor having a magnetic device formed integral therewith and being disposed in proximity to a second one of the plurality of stator windings.

In further accord with the present invention, the second rotor further includes one or more permanent magnets formed integral therewith and being disposed in proximity to a third one of the plurality of stator windings.

In still further accord with the invention, an external power source provides AC to a second one of the plurality of stator windings.

In yet further accord with the present invention, the junction of the first and second rotors includes means for providing electrical connections between the magnetic device of the second rotor and the magnetic device of the first rotor.

In still further accord with the invention, the rotary electrodynamic machine includes first, second and third bearings, wherein the first rotor is supported at a first end by the first bearing and is supported at a second end by the second bearing, and the second rotor is coupled at the junction end to the first rotor and is supported at the pivot end by the third bearing.

In further accord with the invention, the machine includes means for axially clamping the magnetic devices of the first and second rotors.

The invention has several benefits: it produces relatively large electrical output power while being relatively light and small. The invention operates at subcritical speed. It thereby avoids operation at, or transition though, resonance frequencies of the rotor, thus reducing vibration.

The above and other objects, features, and advantages of this invention will become apparent when the following description is read in conjunction with the accompanying drawings.

DETAILED DESCRIPTION OF THE PREFERRED EMBODIMENTS

Figure 1:
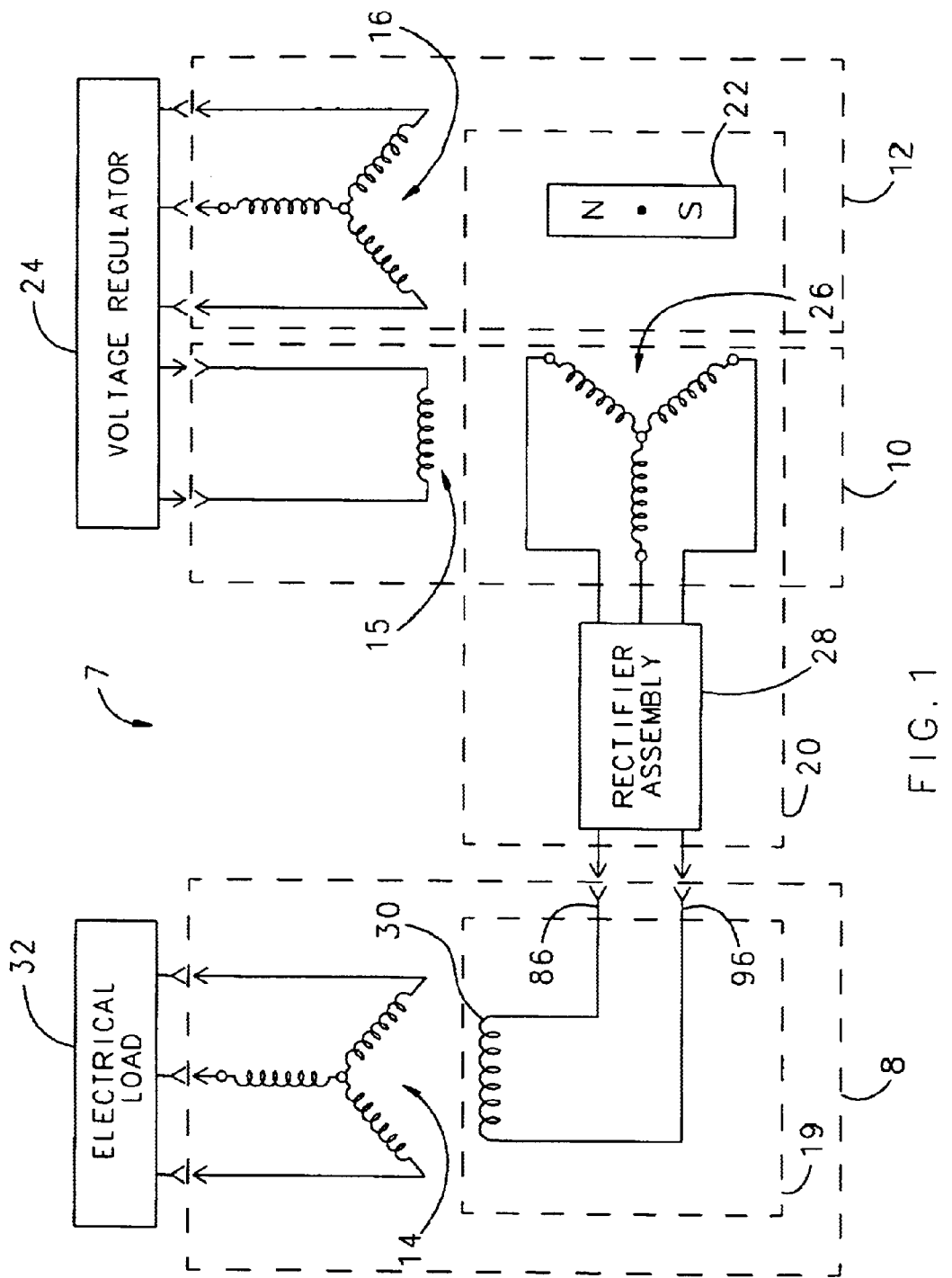
FIG. 1 is an electrical schematic diagram of a generator in accordance with the present invention.

In FIG. 1 is shown the electrical interrelationships in a rotary electrodynamic machine 7, more particularly a brushless generator. The generator 7 comprises three subassemblies: a main generator 8, an exciter generator 10, and a PMG 12. The brushless generator 7 comprises stator windings 14,15,16, a first rotor 19, and a second rotor 20. In an embodiment of the invention for aircraft applications, the generator 7 may be driven by a prime mover (not shown), such as a main or auxiliary engine via a gearbox or a CSD, and the electrical energy produced by the generator may power various loads on the aircraft.

In operation, rotating permanent magnets 22 of the PMG 12 create a rotating magnetic field when the second rotor 20 is driven by the prime mover by means of coupling from the first rotor 19. The rotating magnetic field induces AC in the stator PMG armature winding 16. This induced AC in the winding 16 creates a corresponding AC voltage that is rectified and regulated in a voltage regulator unit 24 external to the generator to supply DC to the stator winding 15 of the exciter generator 10. The generator 7 may operate without a PMG; an external power source then provides DC to the stator winding 15. The exciter stator winding 15 produces a magnetic field. Within that field, the exciter armature winding 26 integral to the second rotor 20 is rotated to generate a DC to provide the necessary magnetic field in the main generator 8.

In the embodiment of FIG. 1, the exciter current is a three-phase AC. The invention is not limited, however, to three-phase power from the exciter generator 10 or from the PMG 12; any number of phases may be used. The AC from the exciter generator 10 is rectified in a rotating rectifier assembly 28 that is integral to the second rotor 20. The rectified current is connected to the main field winding 30, which is integral to the first rotor 19. The main field winding 30 generates a rotating magnetic field that induces a polyphase output current in the main generator stator winding 14, which may then power an external load 32. The output current is relatively high compared with the exciter current.

It should be apparent to one of ordinary skill in the art from the teachings herein that the rotary electrodynamic machine 7 of the present invention may also be operated as a motor, particularly a synchronous motor. In that embodiment, the stator winding 14 is a polyphase winding that carries the main line current that powers the motor. The first rotor 19 receives DC excitation current from the rectifier assembly 28. When the motor attains full speed, the first rotor 19 rotates at a constant speed determined by the frequency of the main line current. The PMG is not needed in the motor embodiment.

Figure 2:
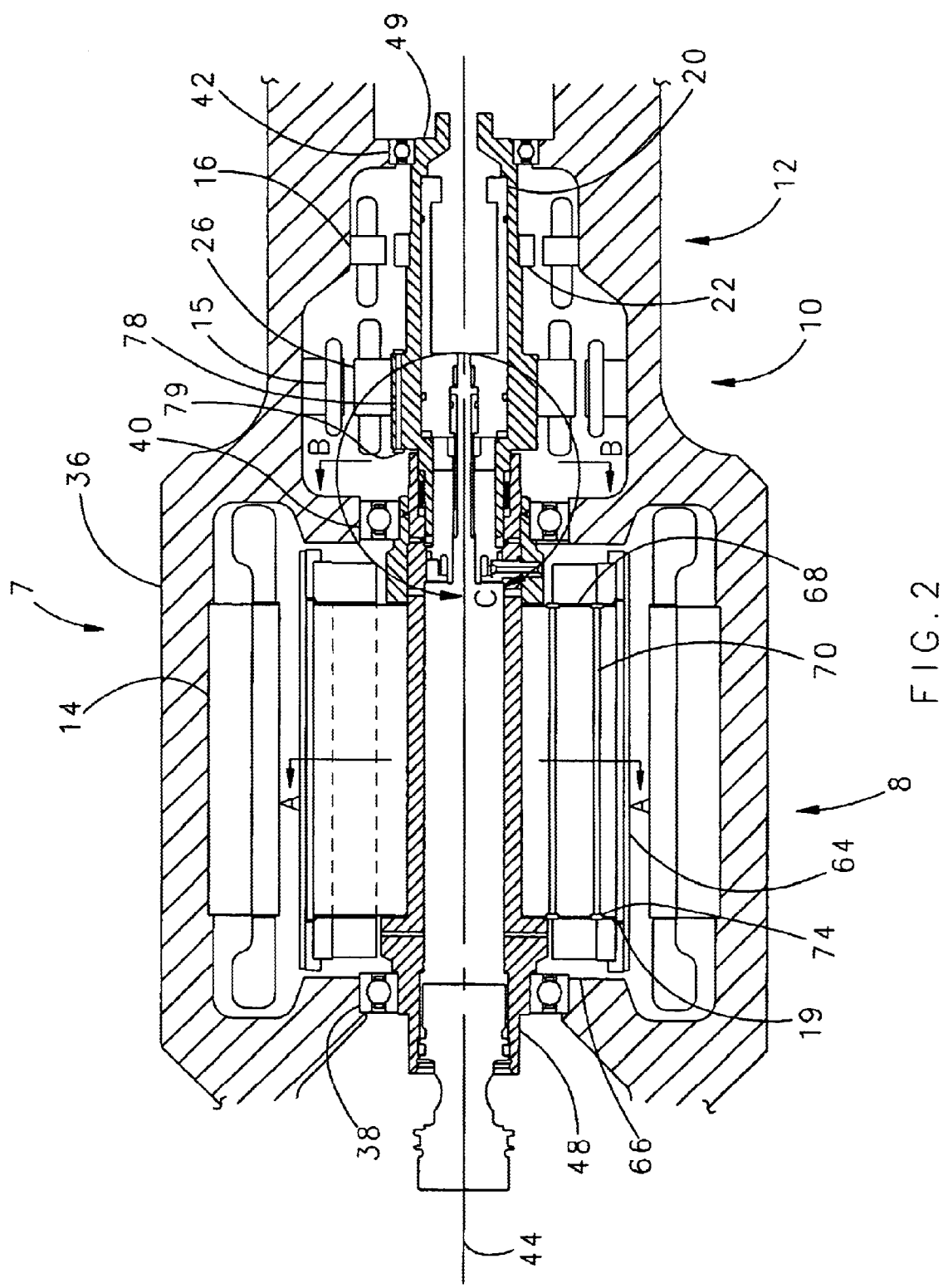
FIG. 2 is a longitudinal cross-sectional view of the generator of FIG. 1 at the generator centerline.

Referring to FIG. 2, a housing 36 contains the rotors 19, 20 and the stator windings 14, 15, 16. The rotors 19, 20 are rotatable within the generally cylindrical stator windings 14, 15, 16. Bearings 38, 40, 42 support the first and second rotors 19, 20 for rotation about a common axis 44. The first rotor 19 is driven by the prime mover through the intermediary of a hollow shaft 48.

Figure 3:
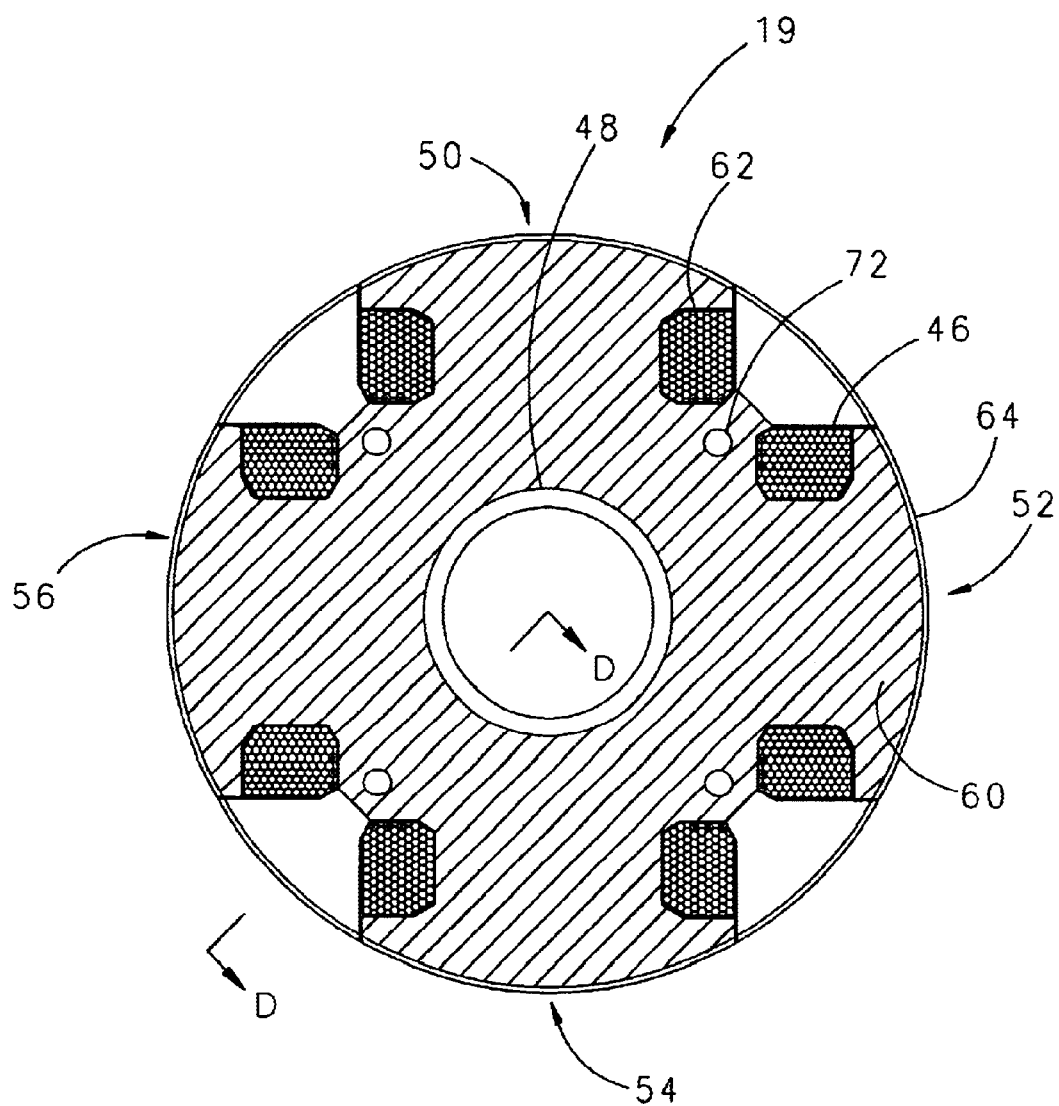
FIG. 3 is a transverse cross-sectional view of a first rotor of the generator taken along the lines A—A of FIG. 2.

Referring also to FIG. 3, an embodiment of the first rotor 19 includes a main field winding 30. The main field winding generally comprises a plurality of coils of wire wound around a magnetic core. This arrangement is commonly referred to as "poles." Four poles 50, 52, 54, 56 are illustrated for exemplary purposes. The invention is not limited to a four-pole embodiment: any number of poles may be used on the first rotor 19. The first rotor 19 has a magnetic core 60 integral to the shaft 48. The core 60 typically further comprises a stack of laminations (not shown) of ferrous material. The main field winding 30 extends axially along recesses 62 in the core. The periphery of the first rotor 19 is enclosed by a tube, or sleeve, 64. End covers 66 and 68 (FIG. 1), may be provided at opposite ends of the tube 64. The end covers 66, 68 may be omitted, and the first and last laminations then act as the end covers.

Figure 4:
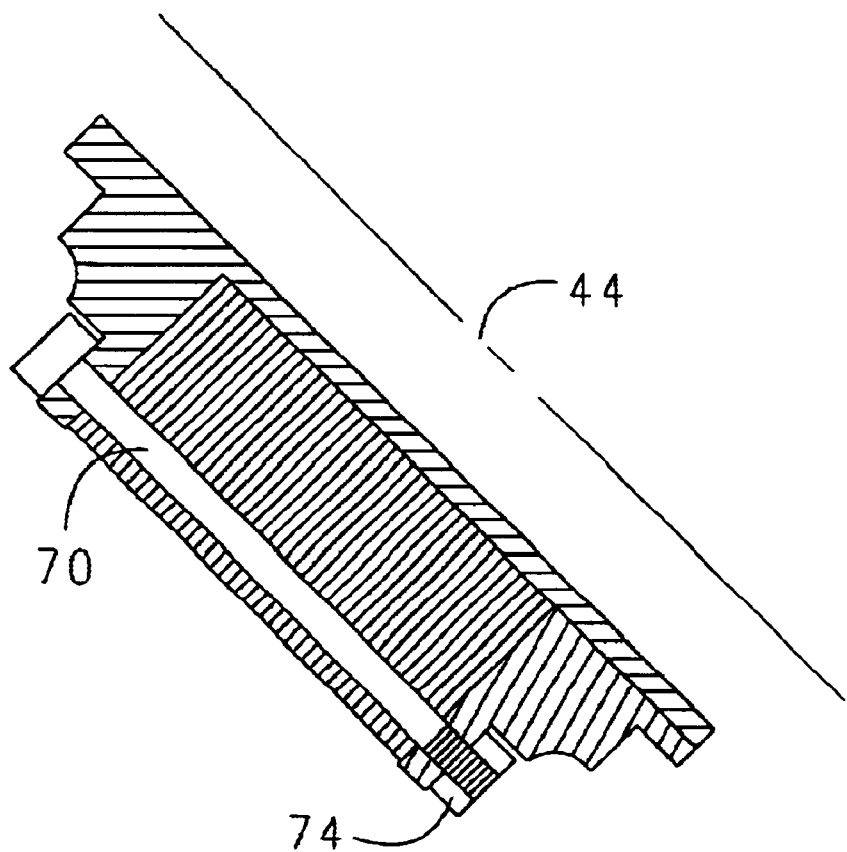
FIG. 4 is a longitudinal cross-sectional view of the rotor of FIG. 3 taken along the lines D—D of FIG. 3.

Because the first rotor 19 is relatively long and heavy, it must be comparatively rigid, compact, and balanced so that it may be rotated at high speed without undue deformation or vibration. Therefore, tie rods or bolts 70 (FIG. 4) are inserted though holes 72 and fastened at each end with nuts 74, or other similar devices, to axially clamp the first rotor 19. The rods 70 and nuts 74 compress the laminations of the first rotor 19, which increases the bending stiffness thereof. The core of the second rotor 20 may be clamped in a similar fashion with rods 78 and nuts 79; however, because the second rotor is has a shorter bearing span and is lighter, rigidity is relatively less of a problem in the second rotor 20 compared with the first rotor 19. The rigidity of the first and second rotors 19, 20 contributes to allowing the generator 7 to operate at subcritical speed by reducing deformation of the rotors under centrifugal force.

In the prior art, a larger generator output requires a relatively massive rotor core and winding to produce a comparatively strong magnetic field. The present invention uses a dedicated rotor, the first rotor 19, which is used for the main generator 8 only. The exciter generator 10 and the PMG 12, isolated on the second rotor 20, are relatively lighter. Therefore, the first rotor 19 may be made comparatively lighter, stiffer, and shorter than the prior art rotors, and thus the first rotor may be rotated at a relatively higher speed while remaining subcritical.

Figure 5:
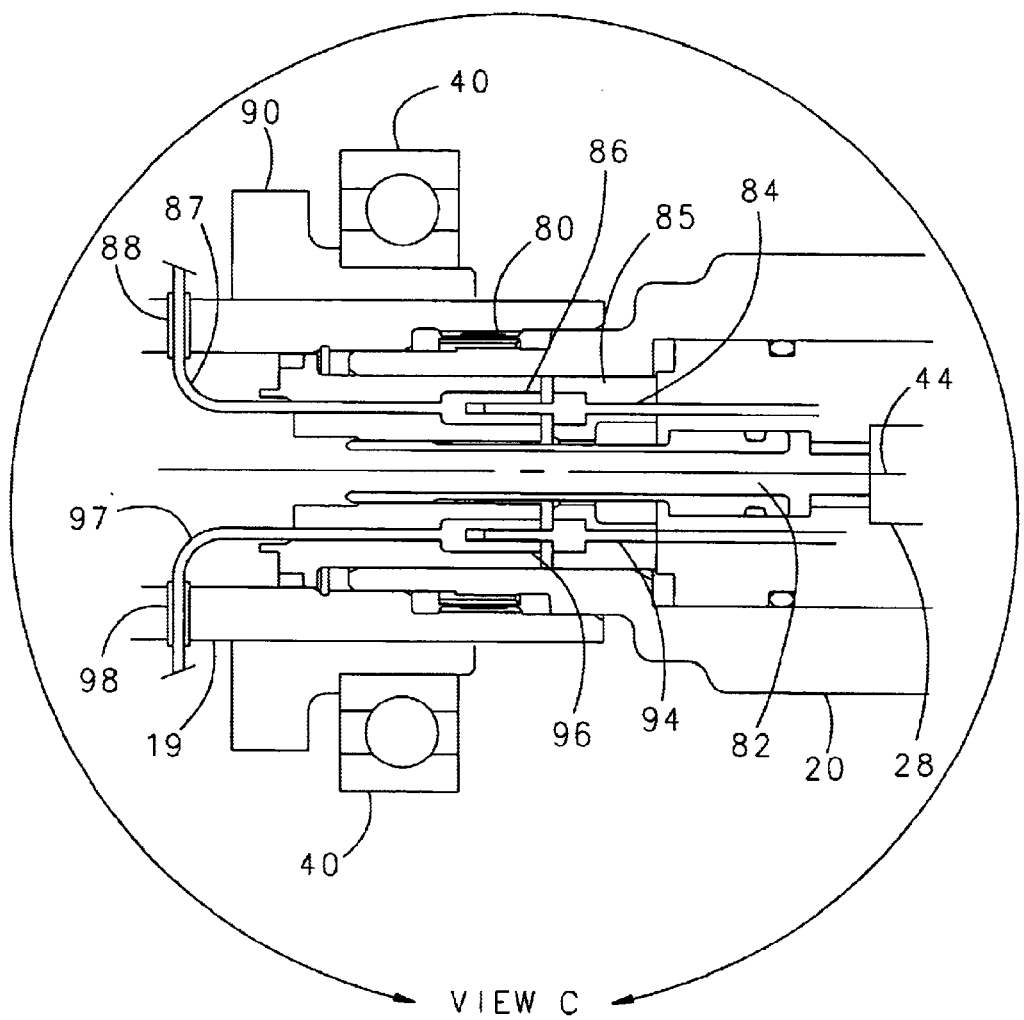
FIG. 5 is an enlarged view of the detailed area labeled "C" of FIG. 2 at the connection of the first and second rotors of the generator.

The second rotor 20 is connected mechanically, thermally, and electrically with the first rotor 19 as illustrated in FIG. 5. Mechanically, the bearing 40 supports the first rotor 19 at one end. The second rotor 20 has junction and pivot ends. The junction end of the second rotor joins the first rotor at a spline connection 80. The bearing 42 (FIG. 2) supports the pivot end of the second rotor 20. Thus, the second rotor is coupled to the first rotor and driven by the prime mover. Only three bearings are required in the generator 7. The bearing span for the first rotor 19 (the distance between bearings 38, 40) is relatively short, which facilitates operation of the first rotor below the critical speed.

Thermally, a pump or similar means (not shown) is used to force a fluid such as oil or a gas through a tube 82. The tube is coextensive between the first and second rotors 19, 20. The fluid either may bathe the main field winding 30 or be jetted thereon in known ways. In addition, the fluid cools the rectifier assembly 28 and the other rotor and stator windings 26, 14, 15, 16. A fluid such as oil must lubricate the moving parts such as the bearings. A pump (not shown) may be driven by the second rotor 20, or else the fluid may be supplied under pressure from an external source (not shown). When the pumping function is removed from the first rotor 19, the load on the bearings of the first rotor may be reduced.

Figure 6:
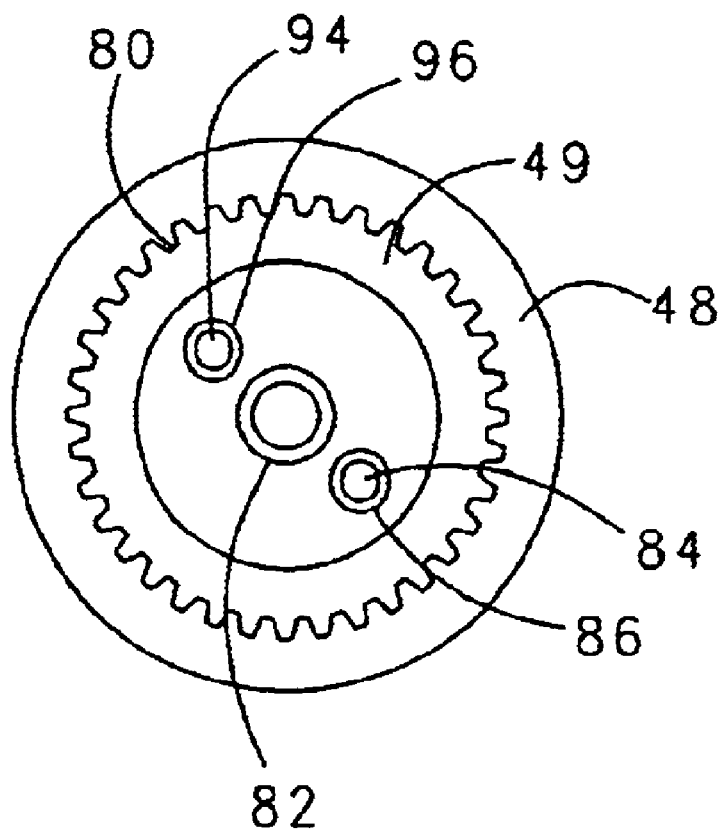
FIG. 6 is a transverse cross-sectional view taken along the lines B—B of FIG. 2.

Electrically, conductors 84 and 94 conduct DC to and from the rectifier assembly 28, though connectors 86 and 96 (FIG. 1), into the first rotor 19, where conductors 87 and 97 pass though insulated sleeves 88 and 98. The connectors 86 and 96 electrically connect the main field 30 on the first rotor with the rotating rectifier assembly 28 that is integral with the second rotor 20. Because the connectors are carrying DC, not polyphase current, only two connectors are needed. Referring now to FIG. 6, the first rotor 19 connects with the second rotor 20 at the spline connection 80. Connectors 86 and 96 as well as the tube 82 pass between the rotors 19, 20. The connectors are arranged symmetrically about the axis 44, as are all the rotating components in the generator 7, to preserve balance and reduce vibration.

In another embodiment (not shown), the rotating rectifier assembly 28 is integral with the first rotor 19. Then the corresponding electrical connectors are located between the rectifier assembly 28 and the exciter armature winding 26. The number of connectors needed would depend on the number of phases of the exciter armature winding.

Because the second rotor 20 and the first rotor 19 are connected mechanically, thermally, and electrically as described hereinabove, the generator is relatively straightforward to assemble, disassemble, repair. Once the housing 36 is opened, the first and second rotors 19, 20 may be separated for servicing.

One with ordinary skill in the art may understand that the broadest scope of the invention is not limited to a two-rotor embodiment; three or more rotors may be used. The invention may be practiced using any number of phases of power in any of the three subassemblies. Further, although the invention has been described in detail as a generator, the principle of using dual rotors may be utilized in any rotary electrodynamic machine. The invention may be used in either aircraft or land-based applications. The rotor laminations, winding, and bearings may be made of various materials, and the machine may be made in any size. Any prime mover may power the invention when it is embodied as a generator, and any electrical load may be powered by the generator. Likewise, any electrical current source may power the invention when it is embodied as a motor, and the motor may supply torque to any device.

All of the foregoing changes are irrelevant. It suffices for the present invention that a rotary electrodynamic machine comprises a stator having a plurality of windings; a first rotor being mounted within the stator for rotation about an axis, the first rotor having a magnetic device formed integral therewith, and being disposed in proximity to one of the plurality of stator windings, and a second rotor being mounted within the stator for rotation about an axis, the axis of rotation of the second rotor being coaxial with the axis of rotation of the first rotor, the second rotor having junction and pivot ends, the second rotor being connected to the first rotor at the junction end, the second rotor having a magnetic device formed integral therewith and being disposed in proximity to a second one of the plurality of stator windings.

I claim:

1. A rotary dynamoelectric machine comprising:
   a stator having a plurality of windings;
   a first rotor mounted on a first rotor shaft having first and second ends, the first rotor being mounted within the stator for rotation about a first rotor shaft axis, the first rotor having a magnetic device formed integral therewith and being disposed in proximity to one of the plurality of stator windings, and a second rotor mounted on a second rotor shaft having junction and pivot ends, the second rotor shaft being connected to the first rotor shaft at the junction end, the second rotor having a magnetic device formed integral therewith and being disposed in proximity to a second one of the plurality of stator windings.

2. The machine of claim 1, wherein the junction of the first and second rotor shafts further includes means for providing electrical connections between the magnetic device of the second rotor and the magnetic device of the first rotor.

3. The machine of claim 2, wherein the means for providing electrical connections is one or more electrical connectors.

4. The machine of claim 1, further including first, second end third bearings, wherein the first rotor shaft is supported at the first end by the first bearing and is supported at the second end by the second bearing, and the second rotor shaft is coupled at the junction end to thee first rotor shaft and is supported at the pivot end by the third bearing.

5. The machine of claim 1, further comprising one or more permanent magnets integral to the second rotor, such that the magnets are adjacent a third stator winding.

6. The machine of claim 1, wherein the second rotor further comprises a rectifier assembly.

7. The machine of claim 1, wherein the magnetic device of the first rotor is a winding on a core.

8. The machine of claim 1, wherein the magnetic device of the second rotor is a winding on a core.

9. The machine of claim 1, wherein the machine is a generator.

10. The machine of claim 1, wherein the machine is a variable frequency generator.

11. The machine of claim 1, wherein the machine is a motor.

12. The machine of claim 1, wherein the machine is a synchronous motor.

13. The machine of claim 1, further comprising means for axially clamping the main field magnetic device of the first rotor.

14. The machine of claim 13, wherein the main field magnetic device further comprises a plurality of axial holes, and wherein the means for axially clamping the main field magnetic device of the first rotor is a plurality of tie rods inserted though the axial holes, the tie rods being fastened at the first and second ends of the first rotor by means for fastening.

15. The machine of claim 1, further comprising means for axially clamping the magnetic device of the second rotor.

16. The machine of claim 15, wherein the second rotor further comprises a plurality of axial holes, and wherein the means for axially clamping the magnetic device of the second rotor is a plurality of tie rods inserted though the axial holes, the tie rods being fastened at the first and second ends of the second rotor by means for fastening.

* * * * *